United States Patent [19]

Tabanou et al.

[11] Patent Number: 5,402,069

[45] Date of Patent: Mar. 28, 1995

[54] SPONTANEOUS POTENTIAL MEASUREMENT APPARATUS CONNECTED BETWEEN METALLIC HOUSINGS OF A WELLBORE APPARATUS FOR MEASURING THE SPONTANEOUS POTENTIAL OF AN EARTH FORMATION

[75] Inventors: Jacques R. Tabanou, Houston, Tex.; M. Reza Taherian, Ridgefield; Tarek M. Habashy, Danbury, both of Tex.

[73] Assignee: Schlumberger Technology Corporation, Houston, Tex.

[21] Appl. No.: 80,428

[22] Filed: Jun. 18, 1993

[51] Int. Cl.$^6$ .......................... G01V 3/18; G01V 3/20
[52] U.S. Cl. ..................................... 324/351; 324/366
[58] Field of Search ......... 324/351, 352, 366, 373–375

[56] References Cited

U.S. PATENT DOCUMENTS

| | | |
|---|---|---|
| 2,592,125 | 4/1952 | Doll . |
| 3,638,105 | 1/1972 | Schuster . |
| 3,638,106 | 1/1972 | Cram . |
| 3,798,533 | 3/1974 | Schuster . |
| 3,798,534 | 3/1974 | Schuster . |
| 3,882,376 | 5/1975 | Schuster . |

OTHER PUBLICATIONS

Technical Publication No. 2463 "The S.P. Log: Theoretical Analysis & Principles of Interpretation" by H. G. Doll, New York Meeting, Feb. 1948, AIME.
"Selective SP Logging" by H. G. Doll, Member AIME, Schlumberger Well Surveying Corp., Ridgefield, Conn., vol. 189, 1950, pp. 129–142, Petroleum Transactions, AIME.
"SP Deconvolution and Quantitative Interpretation in Shaly Sands". buy J. R. Tabanou, SWS; R. Glowinski, UH; G. F. Rouault, SWS; The Log Analyst Sep.–Oct. 1988, pp. 332–344.

*Primary Examiner*—Gerard R. Strecker
*Attorney, Agent, or Firm*—Henry N. Garrana; John H. Bouchard

[57] ABSTRACT

A spontaneous potential (SP) sub is interconnected between two metallic housings of a wellbore apparatus and is lowered into a wellbore. A spontaneous potential (SP) of an earth formation trasversed by the wellbore is measured by the SP sub, and a log is generated from the sub which is representative of the spontaneous potential of the formation, the log being substantially free of a special type of distortion which typified the prior art SP measurements taken by prior art SP measurement apparatus. The SP sub includes a measurement electrode, monitoring electrodes placed on both sides of the measurement electrode, a bucking electrode placed on both sides of the monitoring electrodes, current driving circuitry connected to the bucking electrodes, and receiving circuitry connected to the monitoring electrodes. The current driving circuitry delivers a current of sufficient magnitude to each bucking electrode such that the voltage potential between the monitoring electrodes is approximately equal to zero. The current from each bucking electrode is grounded via its own respective metallic housing and not via a surface oriented electrode. The receiving circuitry monitors the voltage between each of the monitoring electrodes and looks for a zero potential difference between the monitoring electrodes. When the receiving circuitry locates the zero potential difference at a moment in time between its monitoring electrodes, the measurement of the spontaneous potential taken by the measurement electrode at that same precise moment in time is received and recorded. A plurality of such measurements made by the measurement electrode represents a log of spontaneous potential of the earth formation traversed by the wellbore which is substantially free of the distortion which typified the prior art SP log measurements.

18 Claims, 11 Drawing Sheets

→ TIME

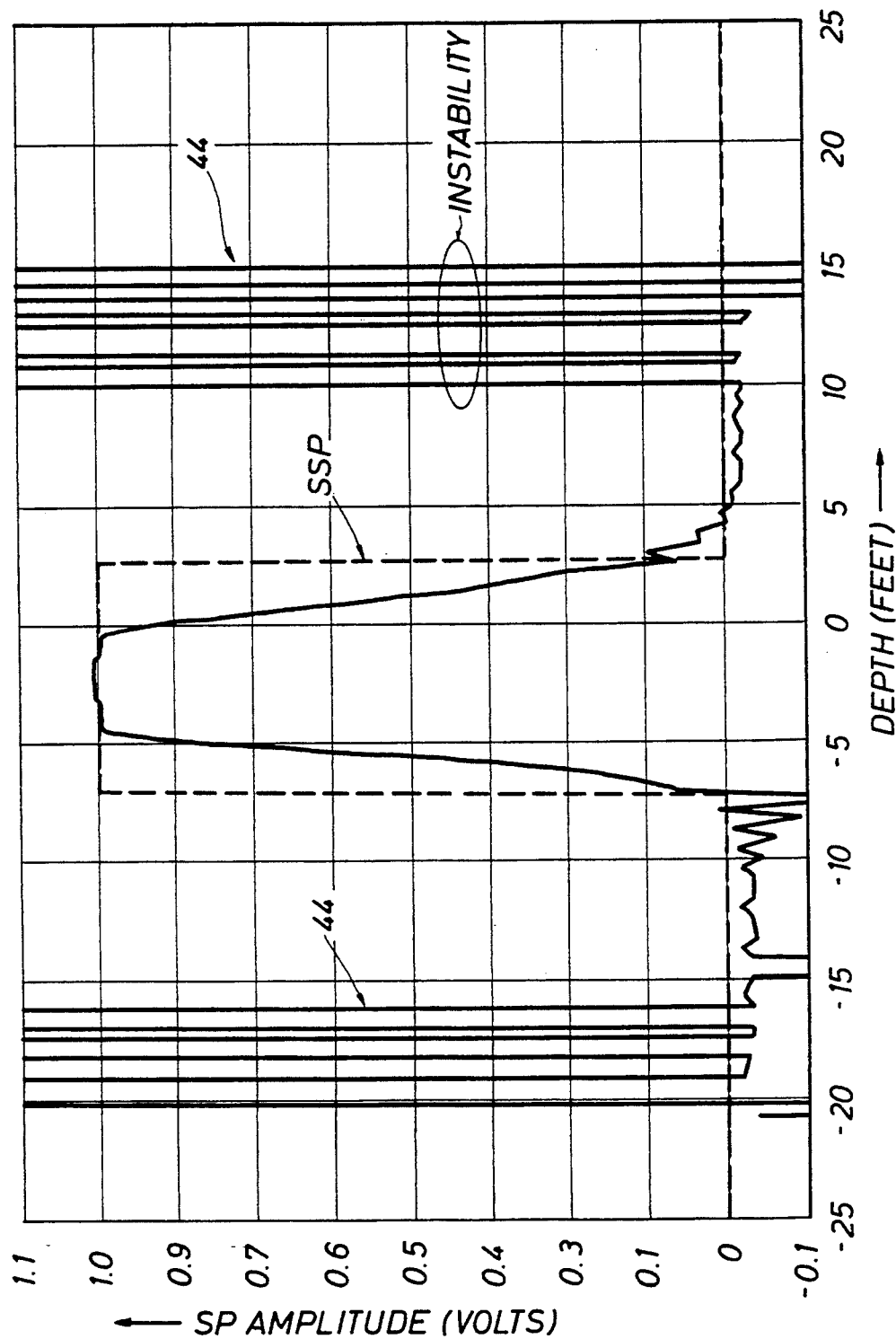

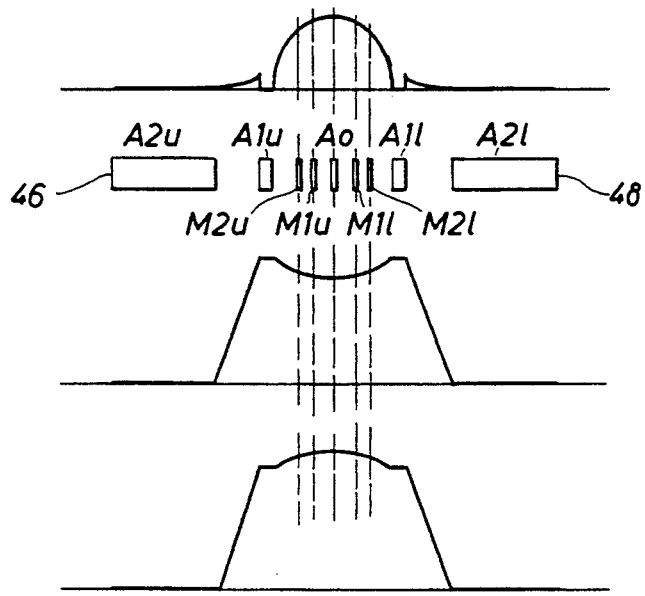
FIG.9a
FIG.9b
FIG.9c
FIG.9d
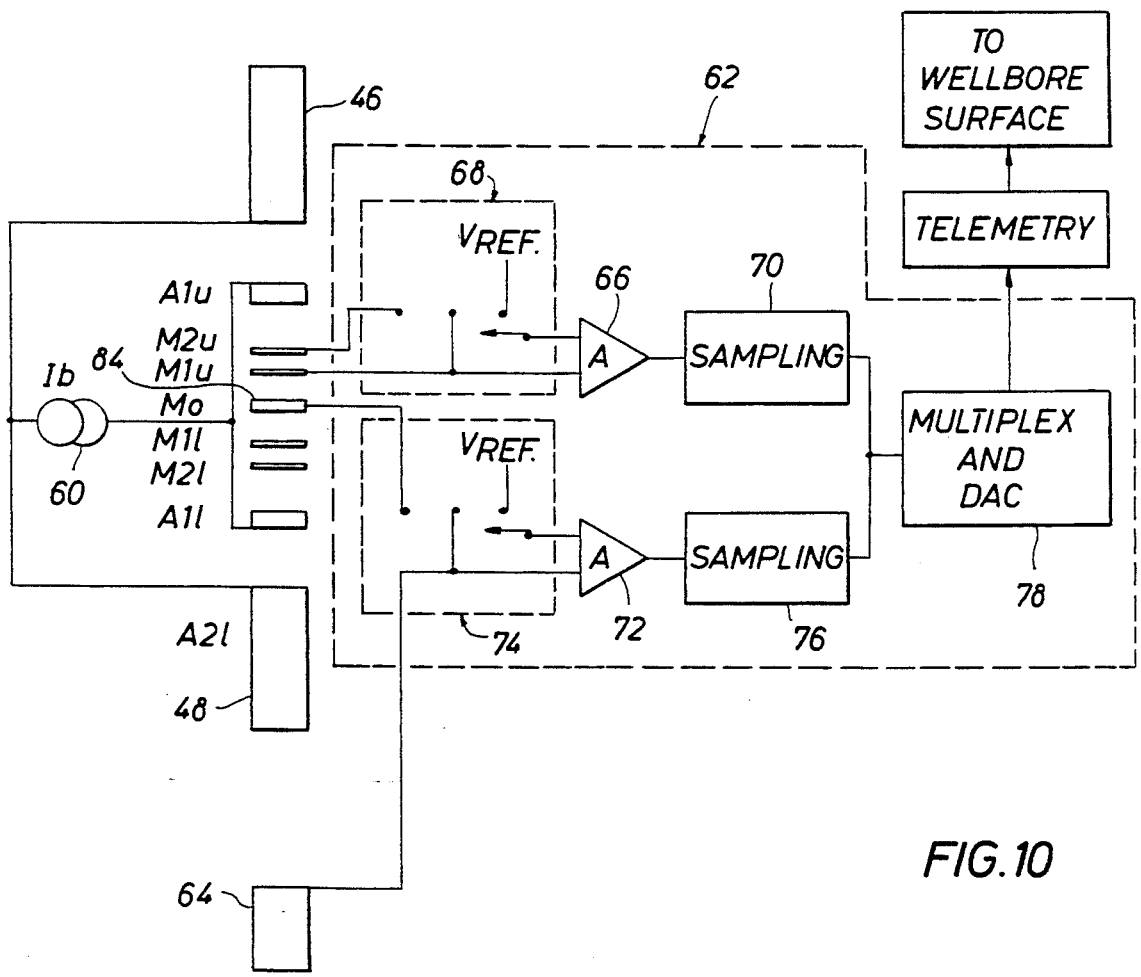
FIG.10

SPONTANEOUS POTENTIAL MEASUREMENT APPARATUS CONNECTED BETWEEN METALLIC HOUSINGS OF A WELLBORE APPARATUS FOR MEASURING THE SPONTANEOUS POTENTIAL OF AN EARTH FORMATION

BACKGROUND OF THE INVENTION

The subject matter of the present invention relates to a measurement apparatus adapted to be connected between metallic housings of a wellbore apparatus for measuring the static spontaneous potential (SP) of an earth formation traversed by the wellbore.

An earth formation traversed by a wellbore contains flowing currents which are generated by a naturally occuring electromotive force (emf) of electrochemical origin present within the formation. Attempts have been made to measure this electromotive force, however, the flowing currents have interferred with the acquisition of an accurate measurement of this electromotive force.

For example, as noted in FIG. 12, a single measurement electrode placed downhole on an insulated mandrel will not accurately produce a true reading of this electromotive force and therefore a distortion will appear in the spontaneous potential (SP) measurement.

As noted in FIG. 13, a measurement electrode is disposed between two metallic housings of the downhole tool. The measurement electrode does not produce a true reading of the electromotive force. More particularly, a spontaneous potential (SP) sub is connected between metallic housings of a wellbore apparatus and the wellbore apparatus is lowered into the wellbore for the purpose of measuring the spontaneous potential of the earth formation. However, the quality of the measurement is adversely affected by the proximity of the metallic housings of the wellbore apparatus disposed on both sides of the SP sub. The SP sub includes a measurement electrode designed to measure the spontaneous potential of the earth formation. The metallic housings of the wellbore apparatus are positioned on both sides of the measurement electrode. The currents generated by the formation's emf flow in the formation. However, since the metallic housings are located on both sides of the measurement electrode, the metallic housings short circuit the flowing currents to ground potential and, in doing so, cause such currents to flow near general vicinity of the measurement electrode of the SP sub. This causes a distortion in the SP measurement. In order to reduce the above referenced distortion, the spontaneous potential (SP) sub was reconnected to the absolute bottom end of the wellbore apparatus so that no metallic housing was present on one side of the measurement electrode. As a result, since one metallic housing was not disposed adjacent the measurement electrode, the quality of the SP measurement was somewhat improved. Nevertheless, since it is always necessary to connect the SP sub to the absolute bottom end of the wellbore apparatus prior to lowering it into the wellbore, the SP measurement is still somewhat distorted.

In addition, as noted in FIG. 4, one partial solution to this problem is found in U.S. Pat. No. 2,592,125 to Doll, the disclosure of which is incorporated by reference into this specification. This partial solution is also discussed in an article entitled "Selective SP Logging", by H. G. Doll, Petroleum Transactions, AIME, vol 189, 1950, the disclosure of which is also incorporated by reference into this specification. This partial solution (hereinafter known as the "Doll Approach") involves the placement of two electrodes G and A on both sides of the measurement electrode M, and driving the A electrode with a current which is sufficient to counteract the naturally occuring flowing currents in the formation and therefore maintain the potential difference between the M and G electrodes at approximately zero potential. As a result, the flowing currents, flowing in the vicinity of the measurement electrode M, are nearly zero. Therefore, at least some of the distortion in the SP measurement, created by these flowing currents, is removed. However, another problem exists with respect to the partial solution suggested by Doll Approach. Although the A electrode is driven with a current sufficient to maintain the M-G electrode potential difference at approximately zero, the current generated by the A electrode must flow via the earth formation to a return or ground electrode located at the surface of the wellbore. In fact, the Doll Approach fails to recognize that the return or ground electrode could be the metallic housing itself. As a result, as shown in FIG. 4, a basic instability is inherent in the model of the Doll Approach. The measurement electrode does not produce a true reading of the electromotive force of the formation and therefore a distortion still appears in the SP measurement.

If the Doll Approach were utilized when the SP sub is connected between the two metallic housings of the wellbore apparatus, the return or ground potential would then be the metallic housings themselves and not the surface oriented electrode. With this new configuration, the basic instability of the Doll Approach is eliminated. With this new configuration, the SP sub could be interconnected between two metallic housings of the wellbore apparatus tool string, still maintain the M-G electrode potential difference at approximately zero, and there would be substantially no distortion in the SP measurement.

SUMMARY OF THE INVENTION

Accordingly, it is a primary object of the present invention to interconnect a spontaneous potential (SP) sub between two metallic housings of a wellbore apparatus adapted to be disposed in a wellbore for the purpose of making an SP measurement of the spontaneous potential in a formation transversed by the wellbore and to simultaneously generate from the SP sub a good quality SP measurement that is substantially devoid of any distortion in such measurement.

It is a further object of the present invention to provide an apparatus in a spontaneous potential (SP) sub interconnected between two metallic housings of a wellbore apparatus tool string for making a spontaneous potential formation evaluation measurement which is substantially improved in terms of quality relative to prior art spontaneous potential measurements.

It is a further object of the present invention to provide an apparatus in a spontaneous potential (SP) sub interconnected between two metallic housings of a wellbore apparatus tool string including a measurement electrode, a pair of monitoring electrodes and a bucking electrode placed on both sides of the measurement electrode, and current sources connected to the bucking electrodes for generating a current of sufficient magnitude from each bucking electrode such that the voltage difference between the pair of monitoring electrodes is approximately zero.

It is a further object of the present invention to provide an apparatus in a spontaneous potential (SP) sub interconnected between two metallic housings of a wellbore apparatus tool string including a measurement electrode, a pair of monitoring electrodes and a bucking electrode placed on both sides of the measurement electrode, and current sources connected to the bucking electrodes for generating a current of sufficient magnitude from each bucking electrode such that the voltage difference between the pair of monitoring electrodes is approximately zero, the voltage difference between metallic housings is approximately zero, and the potential gradient created by the sum of the currents flowing in the formation adjacent the metallic housings and the bucking electrodes is approximately zero.

In accordance with these and other objects of the present invention, a spontaneous potential (SP) sub is interconnected between two metallic housings of a wellbore apparatus and is lowered into a wellbore. A spontaneous potential (SP) measurement is taken by the SP sub. That is, the spontaneous potential of an earth formation transversed by the wellbore is measured by the SP sub, and a log is generated from the sub which is representative of the spontaneous potential of the formation, the log being substantially free of a special type of distortion which typified the prior art SP measurements taken by prior art measurement apparatus. The SP sub includes a measurement electrode, a pair of monitoring electrodes placed on both sides of the measurement electrode, a bucking electrode placed on both sides of the monitoring electrodes, current driving circuitry connected to the bucking electrodes, and receiving circuitry connected to the monitoring electrodes. To current driving circuitry delivers a current of sufficient magnitude to each bucking electrode such that the voltage potential between the pair of monitoring electrodes is approximately equal to zero. The current from each bucking electrode is returning via its own respective metallic housing and not via a surface oriented electrode. The receiving circuitry monitors the voltage between each of the pair of monitoring electrodes and looks for a zero potential difference between each of the pair of monitoring electrodes. When the receiving circuitry locates the zero potential difference between its monitoring electrodes at a particular moment in time, the measurement of the spontaneous potential taken by the measurement electrode at said particular moment in time is received and recorded. A plurality of such measurements made by the measurement electrode are printed on a log, and such log (an SP log) represents the spontaneous potential of the earth formation transversed by the wellbore. This SP log is substantially free of the distortion which typified the prior art SP log measurements.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 4 illustrates a basic instability inherent in the construction of the Doll Patent of FIGS. 2-3;

FIGS. 9a–9d illustrate the potential generated by the electrode array of the spontaneous potential measurement apparatus of FIGS. 7-8 of the present invention before monitoring conditions are applied and after monitoring conditions are applied;

FIGS. 10, 11a–11d illustrate a detailed construction of the spontaneous potential measurement apparatus forming the spontaneous potential sub connected between two metallic housings of the present invention including the current driving circuitry and the receiving circuitry connected to the electrode array of FIGS. 7-9b for applying and maintaining the aforementioned monitoring conditions to the electrode array; and FIGS. 12-21 illustrate graphs of SP amplitude vs depth, which graphs confirm and verify the effectiveness of the spontaneous potential measurement apparatus of the present invention in eliminating a distortion normally present in prior art logs of the earth's formation spontaneous potential, of which:

FIG. 12 illustrates, in accordance with the prior art, a spontaneous potential measurement taken by a single measurement electrode on an insulating mandrel, which measurement is highly distorted relative to the true, correct and accurate measurement of the spontaneous potential of the earth's formation;

FIG. 13 illustrates, in accordance with the prior art, the spontaneous potential taken by the measurement electrode when disposed between two metallic housings of an SP sub, but without forcing the potential difference between two monitoring electrodes to be approximately equal to zero, and FIG. 15 illustrates, in accordance with the present invention, the spontaneous potential taken by the measurement electrode when disposed between two metallic housings of an SP sub; however, a current of sufficient magnitude drives the bucking electrodes such that the potential difference between two monitoring electrodes is approximately equal to zero.

DETAILED DESCRIPTION OF THE PREFERRED EMBODIMENT

Figure 1A:
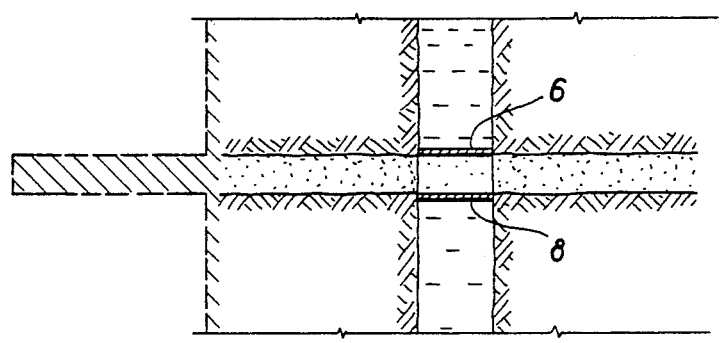
FIGS. 1a–1b illustrate the spontaneous potential in an earth formation and naturally occuring currents flowing in the formation.
Figure 1B:
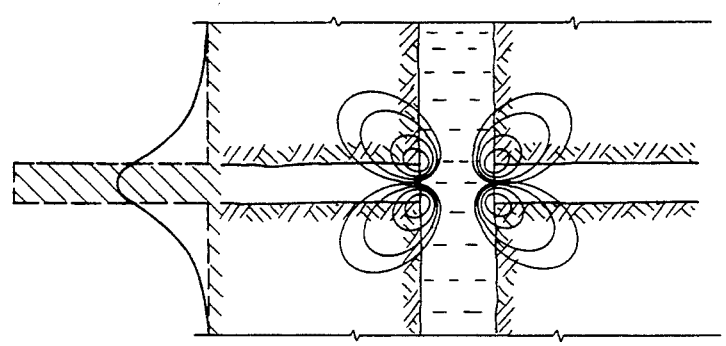

Referring to FIGS. 1a–1b, the spontaneous potential in an earth formation and naturally occuring currents flowing in the formation are illustrated.

FIGS. 1a–1b are illustrated in a fundamental paper written by H. G. Doll entitled "The SP Log: Theoretical Analysis and Principles of Interpretation", issued as TP 2463 in PETROLEUM TECHNOLOGY, September 1948 (hereinafter, the "Doll Paper"), the disclosure of which is incorporated by reference into this specification.

Quoting from the Doll paper, in order to get a better understanding of the effect of the electromotive force (emf), it is convenient to consider first an idealized case where the SP currents are prevented from flowing. In this connection, refer to FIG. 1a.

FIG. 1a represents a drill hole section that traverses two identical beds of clay separated by a rather thin salt-water sand. Although this would not be feasible in practice, it may be conceived that two insulating plugs 6, 8 are placed in the hole to interrupt the electrical continuity of the mud column at the two boundaries between sand and clay. The potential drop in the mud of the drill hole measures only part of the total emf useless the electrical resistance offered by the mud is very large compared to the electrical resistance of one of the formations. The SP log records the potential drop occuring in the mud. On the diagram of FIG. 1a, the potential in the mud is plotted versus depth. As it corresponds to the case where no current is flowing, or in other words, to a static equilibrium, it will be designated hereafter as the "static spontaneous potential diagram" or an "SSP" diagram. It represents, in a convenient manner, the values of the emf which produce the SP currents and which therefore determine the SP log.

FIG. 1b represents the same schematic of FIG. 1a except that the insulating plugs of FIG. 1a have been removed to reestablish the continuity of the mud column. In these conditions, there is no longer a static equilibrium, but rather a dynamic state. The SP current can flow in the drill hole through the mud as well as through the formations.

However, in the early days of well logging, the Spontaneous Potential (SP) log was used extensively by interpreters to detect clean permeable zones and to estimate the potential of hydrocarbon zones in a formation traversed by a wellbore. In today's modern formation evaluation programs, except for well-to-well correlation and qualitative shalyness estimation, deliterious conditions exist which adversely affect the quality of the SP measurement. As a result, no real quantitative use is made of the SP measurement for several reasons:

1. SP amplitude is reduced in thin beds;
2. SP amplitude and log character at bed boundaries is affected be resistivity and degree of invasion of permeable formations, as well as by the resistivity of adjacent impervious beds;
3. SP amplitude is affected in shaly sands by the presence of laminated or dispersed clays; and
4. the quality of the SP measurement is affected by the proximity of metallic housings.

Figure 12:
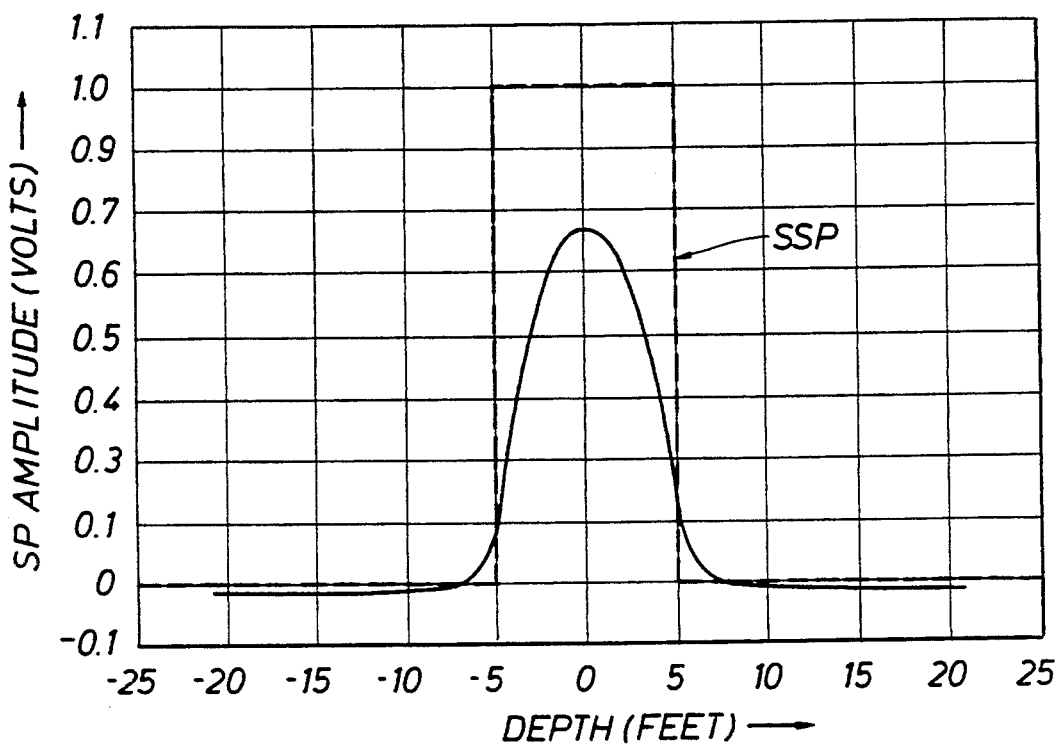

For example, referring to FIG. 12, a single measurement electrode placed downhole will not accurately produce a true, accurate reading of the electromotive force in the earth's formation and therefore a distortion will appear in the spontaneous potential (SP) measurement.

Figure 13:
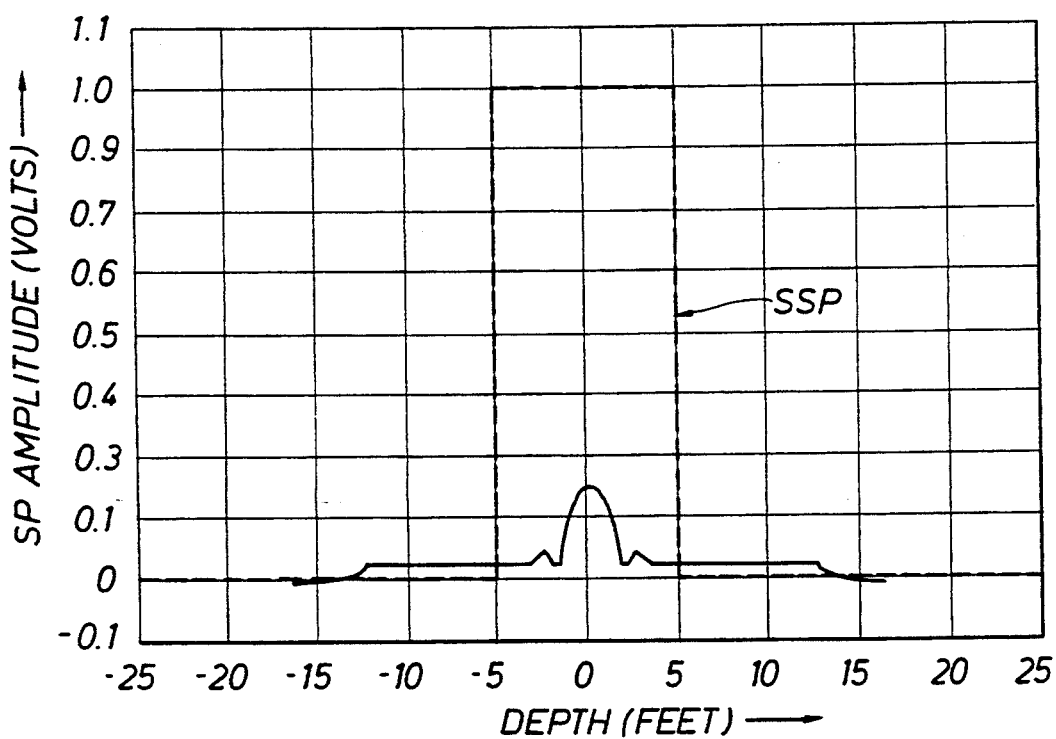

Referring to FIG. 13, a measurement electrode is disposed between two metallic housings of the downhole tool. The measurement electrode does not produce a true reading of the electromotive force of the earth's formation. More particularly, a spontaneous potential (SP) sub is connected between metallic housings of a wellbore apparatus and the wellbore apparatus is lowered into the wellbore for the purpose of measuring the spontaneous potential of the earth formation. However, the quality of the measurement is adversely affected by the proximity of the metallic housings of the wellbore apparatus disposed on both sides of the SP sub. The SP sub Includes a measurement electrode designed to measure the spontaneous potential of the earth formation. The metallic housings of the wellbore apparatus are positioned on both sides of the measurement electrode. The currents generated by the formation's emf flow in the formation. However, since the metallic housings are located on both sides of the measurement electrode, the metallic housings short circuit the flowing currents to ground potential and, in doing so, cause such currents to flow near the general vicinity of the measurement electrode of the SP sub. This causes a distortion in the SP measurement.

In order to reduce the above reference distortion, the spontaneous potential (SP) sub was re-connected to the absolute bottom end of the wellbore apparatus so that no metallic housing was present on one side of the measurement electrode. As a result, since one metallic housing was not disposed adjacent the measurement electrode, the quality of the SP measurement was somewhat improved. However, since it was necessary to mount the prior art SP sub on the absolute bottom of the tool string in the wellbore, one could not mount any other tool below the SP sub in the tool string without dramatically affecting the quality of the SP measurement. Therefore, the SP measurement is still somewhat distorted.

Alternatively SP sub designs have been proposed in the past for improving the quality of the SP measurement. For example, U.S. Pat. No. 3,638,105 to N. A. Schuster entitled "Methods and Apparatus for Investigating the Spontaneous Potential of Earth Formations" suggested measuring the current developed inside the wellbore to extend the range of the SP in salt saturated mud. In addition, in U.S. Pat. Nos. 3,638.106; 3,798,533; 3,798,534; and 3,882,376, a differential SP measurement (SPARC) sub was conceived to minimize SP noise induced by magnetization of the cable drum. However, for the reasons previously noted, the quality of the SP measurement remained unacceptable.

Figure 2:
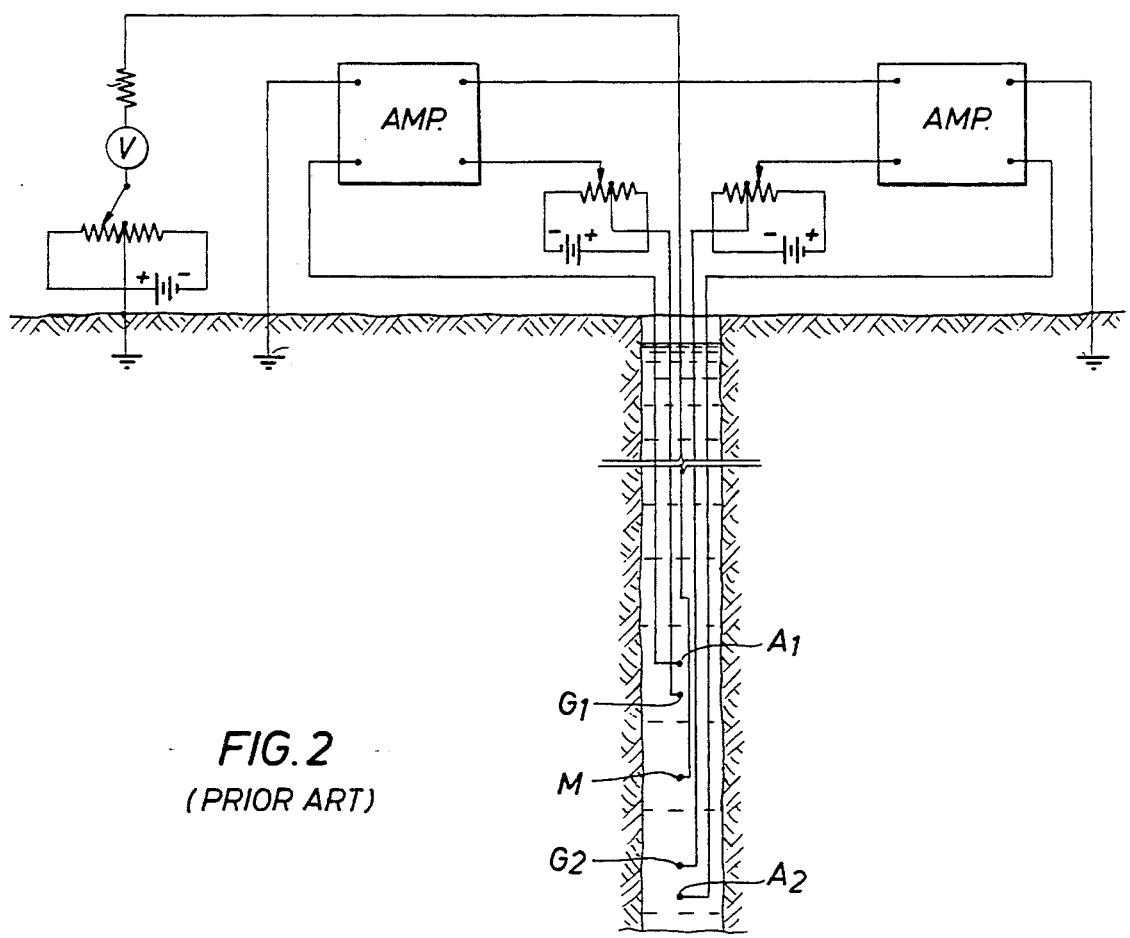
FIG. 2 illustrates a construction of a prior art method and apparatus for logging static spontaneous potentials in wells set forth in U.S. Pat. No. 2,592,125 to Henri-Georges Doll (the Doll Approach)
Figure 3:
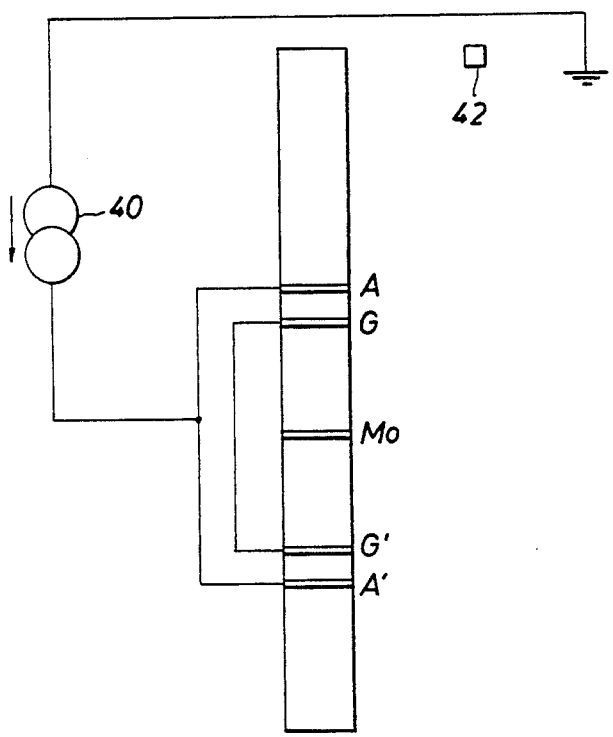
FIG. 3 illustrates a simplified construction of the prior art Doll Patent of FIG. 2.

Referring to FIGS. 2 and 3, a construction of the prior art "Doll Approach", as set forth in U.S. Pat. No. 2,592,125 to Doll and in the article entitled "Selective SP Logging" to Doll, is illustrated. FIG. 2 illustrates the actual construction of the Doll Approach as seen in the '125 patent to Doll, and FIG. 3 illustrates a simplified construction of the Doll Approach as seen in the '125 patent.

In FIG. 2, two electrodes G1, A1 and G2, A2 are placed on both sides of a measurement electrode M. The A electrodes are driven with a current which is sufficient to counteract the naturally occuring flowing currents in the formation (shown in FIG. 1b) such that the potential difference between the M electrode and the G1, G2 electrodes is approximately zero. However, although the A electrode is driven with a current sufficient to maintain the M-G electrode potential difference at approximately zero, the current generated by the A electrode must flow via the earth to a return or ground electrode located at the surface of the wellbore. As a result, a basic instability is still inherent in the model of the Doll Approach.

In FIG. 3, a simplified construction of the FIG. 2 embodiment of the Doll Approach illustrates a current source 40 driving the A electrodes with a current sufficient to maintain the M-G electrode potential difference at approximately zero. However, the return of such current is toward an electrode 42 located at the surface of the wellbore. Consequently, the basic instability remains in the model of the Doll Approach.

Referring to FIG. 4, a model of the Doll Approach, showing this basic instability, is illustrated. In FIG. 4, notice the sidelobes 44 which exemplify the aforementioned basic instability of the Doll Approach.

As a result, there is still a strong interest with clients to acquire an accurate SP log, especially if one could measure the static spontaneous potential (SSP) without any distortion in the SP measurement. There is a need for an in-line SP sub in accordance with the present invention which is as short in length as possible and which can be mounted anywhere within the tool string when the tool string is disposed in the wellbore, the SP sub of the present invention generating an SP log which reflects an acceptable SP measurement.

Figure 6:
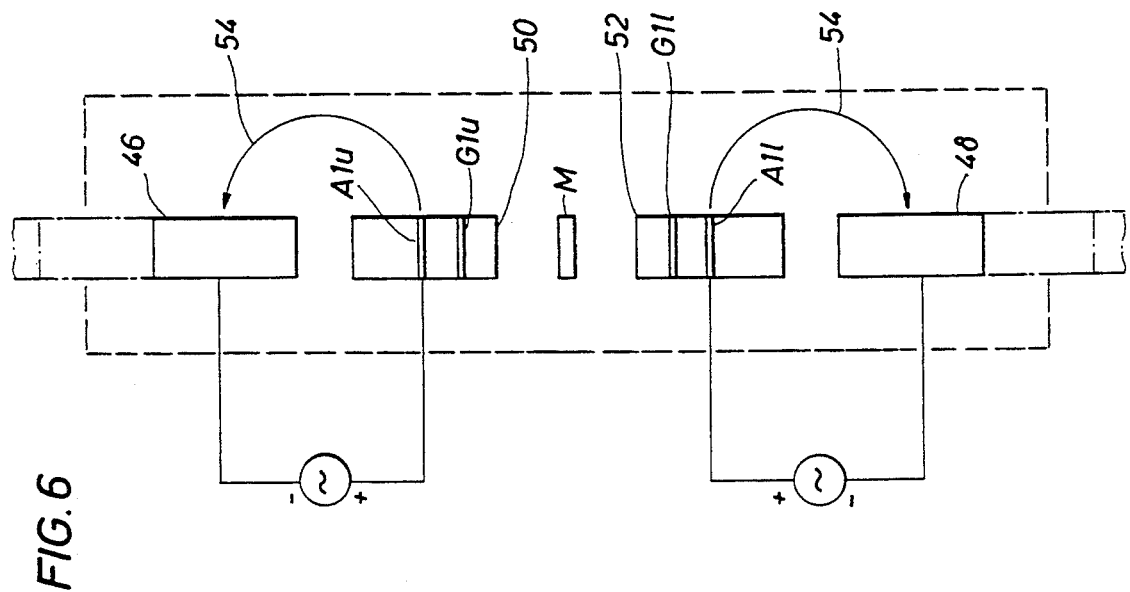
FIG. 6 illustrates a simplified construction of the spontaneous potential measurement apparatus in accordance with the present invention, as compared with the simplified construction of the prior art Doll Patent of FIG. 5.
Figure 5:
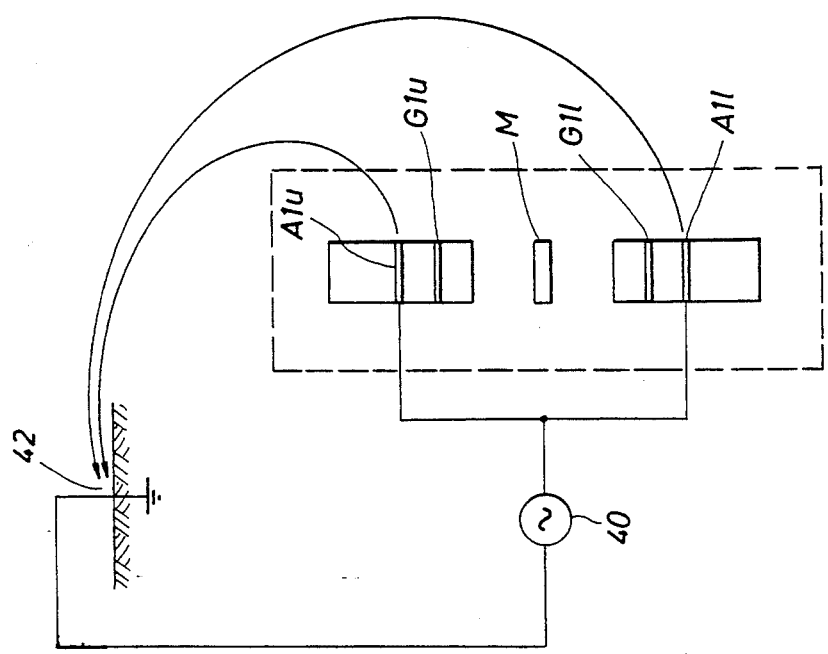
FIG. 5 illustrates another more simplified construction of the Doll Patent of FIGS. 2-3.

Referring to FIGS. 5 and 6, the basic difference between the prior art Doll Approach and the spontaneous potential measurement apparatus in accordance with the present invention is illustrated.

FIG. 5 illustrates a more simplified construction of FIG. 3 illustrating the Doll Approach. In FIG. 5, the potential difference between the M and G electrodes is maintained at approximately zero potential; however, the current from the A electrode must return to ground potential via a ground electrode 42 located at the surface of the wellbore. As noted in FIG. 4, a basic instability is inherent in the Doll Approach in view of the ground electrode 42 located at the surface of the wellbore.

However, in FIG. 6, the spontaneous potential (SP) measurement apparatus in accordance with the present invention also maintain the potential difference between the M and G electrodes at approximately zero potential as in FIG. 5; however, the SP measurement apparatus of FIG. 6 includes a separate metallic housing 46 disposed directly adjacent the housing 50 which contains the A1u electrode, and another separate metallic housing 48 disposed directly adjacent the housing 52 which contains the A1l electrode. As a result, the current from the A1u, A1l electrodes return to ground potential via the metallic housings 46 and 48 and not via the surface oriented electrode 42 of FIG. 5. In addition, the basic instability inherent in the Doll Approach of FIG. 5 is removed as a result of the two metallic housings 46 and 48 disposed on both sides of the A1u, A1l electrodes in FIG. 6; and the SP measurement taken by the measurement electrode M in FIG. 6 is devoid of the unacceptable distortion which was commonplace with respect to the prior art SP measurement apparatus. More importantly, however, by using the FIG. 6 SP measurement apparatus in accordance with the present invention, one need not connect the SP sub of FIG. 6 to the absolute bottom of a tool string in a wellbore. Quite the contrary, one can now connect the SP sub of FIG. 6 anywhere within the tool string.

Figure 7:
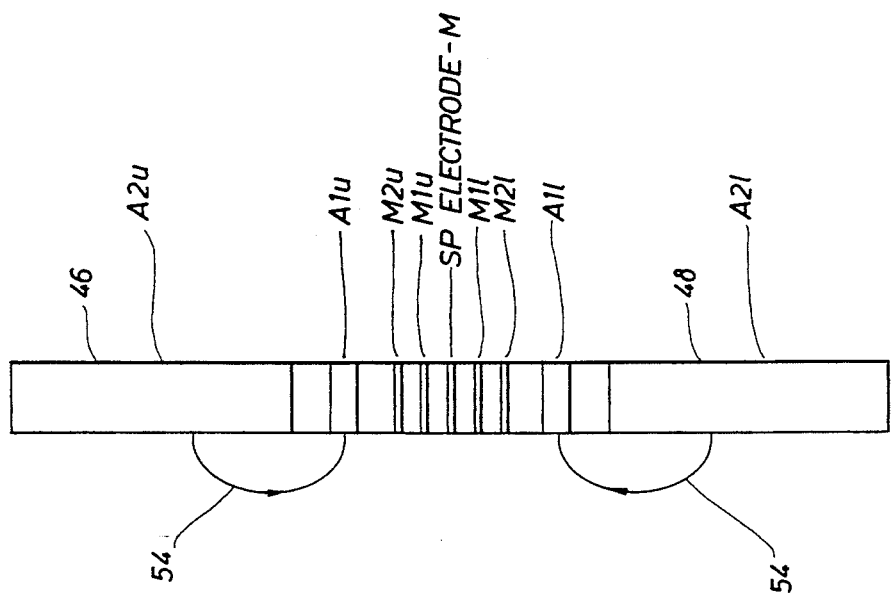
FIG. 7 illustrates a more detailed construction of the spontaneous potential measurement apparatus of FIG. 6 in accordance with the present invention.

Referring to FIG. 7, a more detailed construction of the spontaneous potential measurement apparatus of FIG. 6 in accordance with the present invention is illustrated.

In FIG. 7, the spontaneous potential measurement apparatus of the present invention includes an active electrode array. The active electrode array includes a measurement electrode M (or SP electrode) which measures the spontaneous potential of the formation traversed by the wellbore; and M1u electrode, an M2u electrode, and an A1u electrode disposed on one side of the measurement electrode M; and an M1l electrode, an M2l electrode, and an A1l electrode disposed on the other side of the measurement electrode M. Not shown in the drawing, it is supposed that the measurement electrode M measures the spontaneous potential SP of the earth formation relative to a remote electrode known as 'the fish' which is located at the wellbore surface. The A1u and the A1l electrodes are known as bucking current electrodes. The M1u and M2u electrodes are known as upper monitoring electrodes, and the M1l and M2l electrodes are known as lower monitoring electrodes. The measurement electrode M generate a log known as the Active Spontaneous Potential Log (or ASAP log) indicative of the spontaneous potential of the formation traversed by the wellbore. The ASAP log is given to a client for interpretation purposes, the ultimate objective being the determination of the presence or absence of the deposit of hydrocarbons in the formation traversed by the wellbore.

In accordance with one aspect of the present invention, a metallic housing A2u is disposed on one side of of the active electrode array and another metallic housing A2l is disposed on the other side of the active electrode array. It is assumed that the metallic housing A2u and A2L are each connected to a low impedance. As noted in FIG. 6, a current source is connected to the A1u and A1l electrodes, the current source generating a current from the A1u, A1l electrodes, the current from the A1u, A1l electrodes being returned to a ground potential via the metallic housings A2u, A2l, as indicated by element numeral 54 in FIG. 7 (and not via a surface oriented electrode similar to the surface oriented electrode 42 in FIG. 5). However, as noted in connection with FIG. 6, the current being generated from the A1u and A1l electrodes is sufficient to cause the potential difference between the M1u and M2u electrode to be approximately zero, and to cause the potential difference between the M1l and M2l electrodes to be approximately zero.

Referring again to FIGS 12 and 13, the reason does not accurately measure the static spontaneous potential (SSP) in prior art SP measurement apparatus is because is because the source of the SSP, in an earth formation, can be viewed as a battery loaded by the surrounding formations and the conductive mud column. Furthermore, when a short sub is used, the amplitude of the SP is further reduced by the short circulating effect of the massive metallic housings. This point is illustrated in FIGS. 12 and 13. In order to attempt to measure the SSP, one must minimize the currents flowing into the formation by placing on the sonde, which includes the SP measurement apparatus of the present invention, current sources which will counteract the currents generated by the SP of the earth formation. As noted in FIG. 13, when the array is passive, there is a noticeable voltage gradient on both sides of the measurement electrode M. This voltage gradient can easily be monitored by at least two monitoring electrodes, such as the M1u and M2u monitoring electrodes of FIG. 7. If the potential on the bucking electrodes A1u, A1l are raised to a sufficient potential such that the voltage difference between the monitoring electrodes M1u, M2u and between the monitoring electrodes M1l, M2l is null, then, no vertical current is flowing in the vicinity of the measurement electrode M. This is similar to the conditions which normally exist in the middle of a very thick bed.

Figure 8:
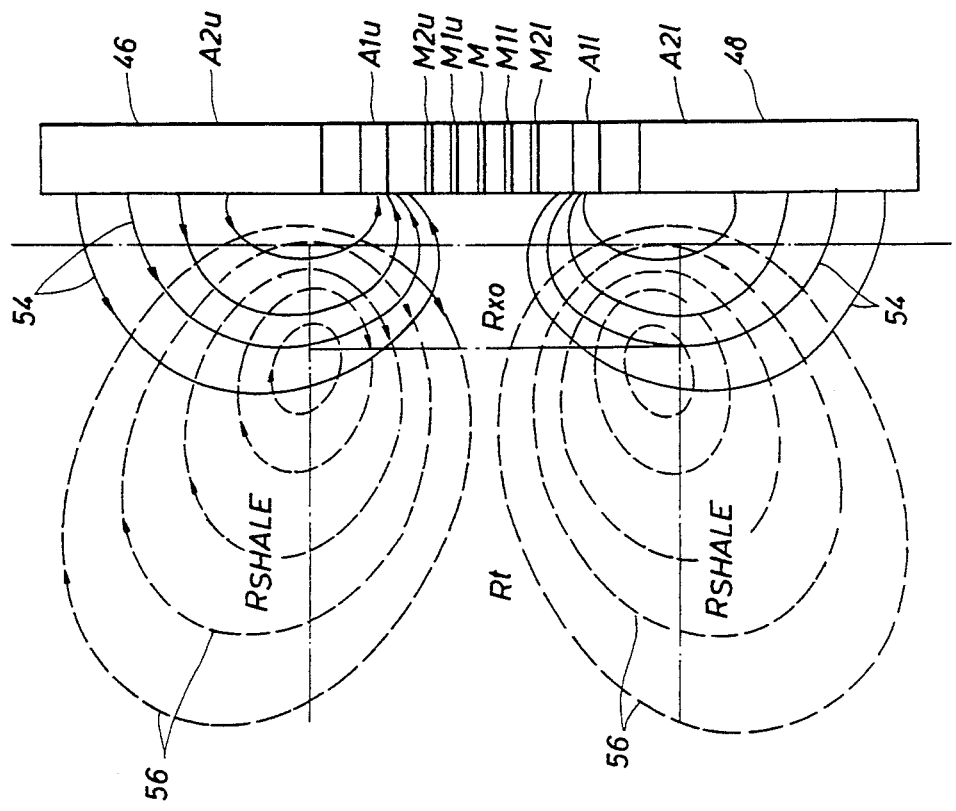
FIG. 8 illustrates the resultant effect of the simplified construction of the spontaneous potential measurement apparatus of FIG. 6 in accordance with the present invention in counteracting and neturalizing the naturally occuring currents flowing in the earth's formation as a result of the formation's emf and thereby reducing or eliminating a distortion normally present in prior art logs of the spontaneous potential of the formation.

Referring to FIG. 8, the resultant of the spontaneous potential measurement apparatus of FIGS. 6 and 7 in accordance with the present invention is illustrated.

In FIG. 8, the currents 54 generated by the bucking electrodes A1u, A1l counteract and neutralize the naturally occuring currents 56 flowing in the earth's formation as a result of the formation's emf. As a result, there are no vertical currents flowing in the vicinity of the measurement electrode M. Therefore, a distortion, which was normally present in prior art logs representative of the spontaneous potential of the formation traversed by the wellbore, is eliminated.

Referring to FIGS. 9a–9d, the potential, generated by the electrode array of the spontaneous potential measurement apparatus of FIGS. 7–8 of the present invention, before monitoring conditions are applied and after monitoring conditions are applied, is illustrated.

In FIG. 9b, the active electrode array (A1u, M2u, M1u, M, M1l, M2l, A1l) of FIGS. 7–8 is shown interconnected between two metallic housings 46 and 48. In addition, the following four 'monitoring conditions' are imposed on the electrode array of FIG. 9b:

1. The voltage difference between the upper monitoring electrode M2u, M1u is approximately zero; that is, $$V(M2u) - V(M1u) = 0$$

2. The voltage difference between the lower monitoring electrodes M2l, M1l is approximately zero; that is, $$V(M2l) - V(M1l) = 0$$

3. A short circuit exists between the two bucking electrodes A1u, A1l (see FIG. 10); that is, $$V(A2u) - V(A2l) = 0$$

4. The sum of the Active Spontaneous Potential current is zero, indicative of the presence of the metallic housing 46, 48 disposed on both sides of the active electrode array as a short circuit to ground potential; that is, $$I(A2u) + I(A1u) + I(A1L) + I(A2L) = 0.$$

The above four 'monitoring conditions' are imposed on the active electrode array of FIG. 9b when the electrode array of FIG. 9b is interconnected between the two metallic housings 46, 48, FIGS. 9a, 9c, and 9d. Note that the following potentials exist along the sonde of FIG. 9b under the following conditions.

In FIG. 9a, a spontaneous potential (SP), shown in FIG. 9a, exists in the formation traversed by the wellbore when the aforementioned monitoring conditions are not applied to the electrode array. The electrode array is passive, that is, the bucking electrodes A1u and A1l are not being energized by a current from a current source and the potential between the monitoring electrodes M1u, M2u and M1l, M2l is not necessarily zero; FIG. 9a shows this SP potential along the sonde.

In FIG. 9c, a potential, shown in FIG. 9c, exists in the formation when the aforementioned monitoring conditions are applied to the electrode array and a spontaneous potential (SP) does not exist in the formation. FIG. 9c shows the resulting potential generated by the electrode array. Note that the voltage difference between the monitoring electrodes M1u, M2u and between the monitoring electrodes M1l, M2l is not approximately zero.

In FIG. 9d, a potential is generated by the electrode array of FIG. 9b after the aforementioned monitoring conditions are applied to the electrode array and when a spontaneous potential (SP) exists in the formation traversed by the wellbore. FIG. 9d shows the resulting potential generated by the electrode array. In FIG. 9d, note that the voltage difference between the monitoring electrodes M1u, M2u and between the monitoring electrodes M1l, M2l is approximately zero.

Figure 14:
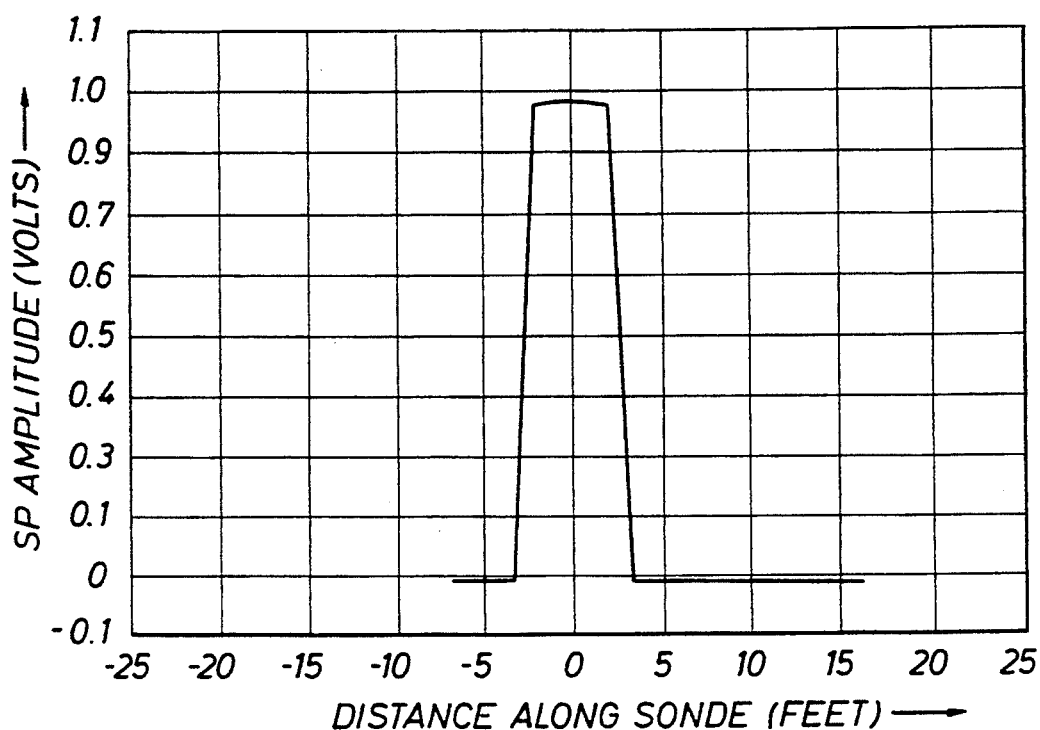
Figure 15:
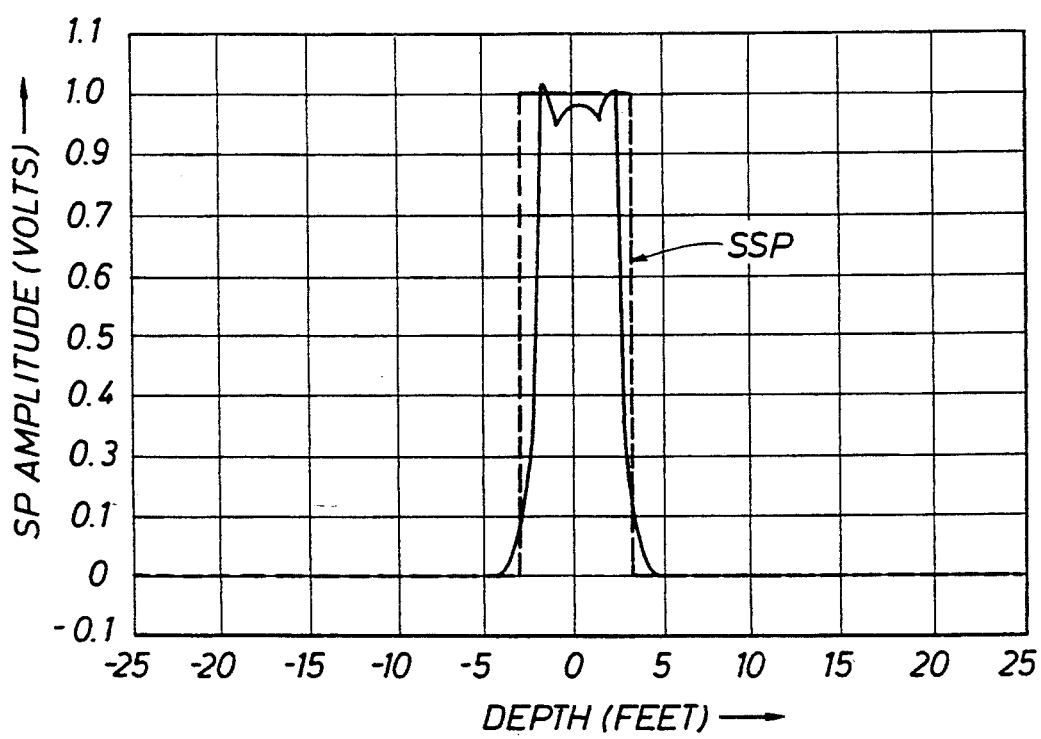
Figure 16:
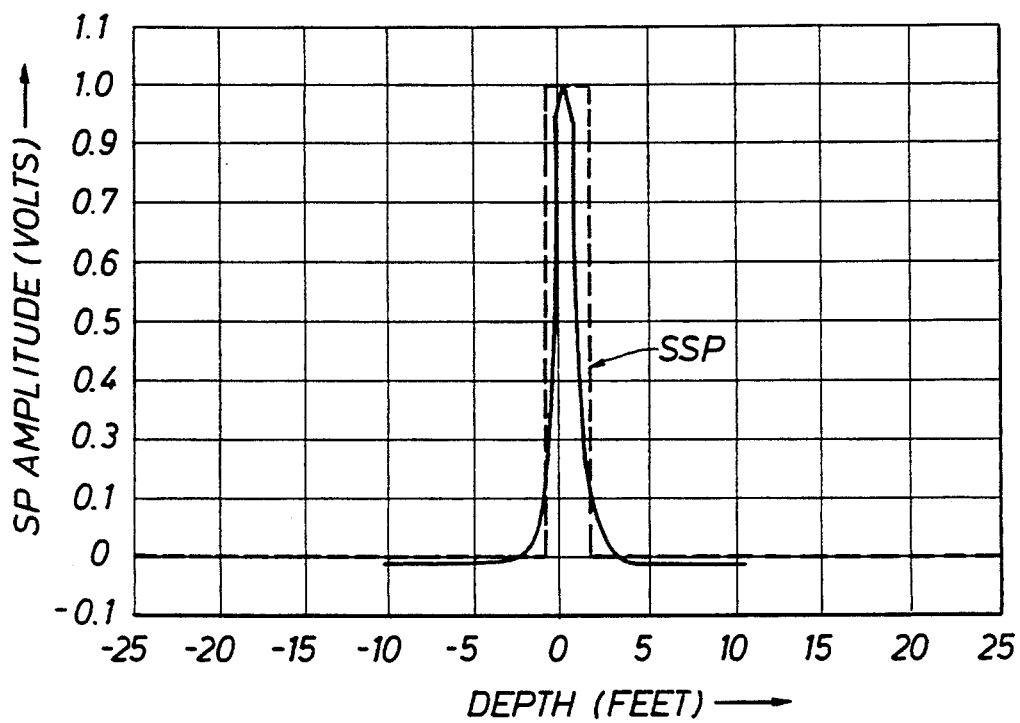
Figure 17:
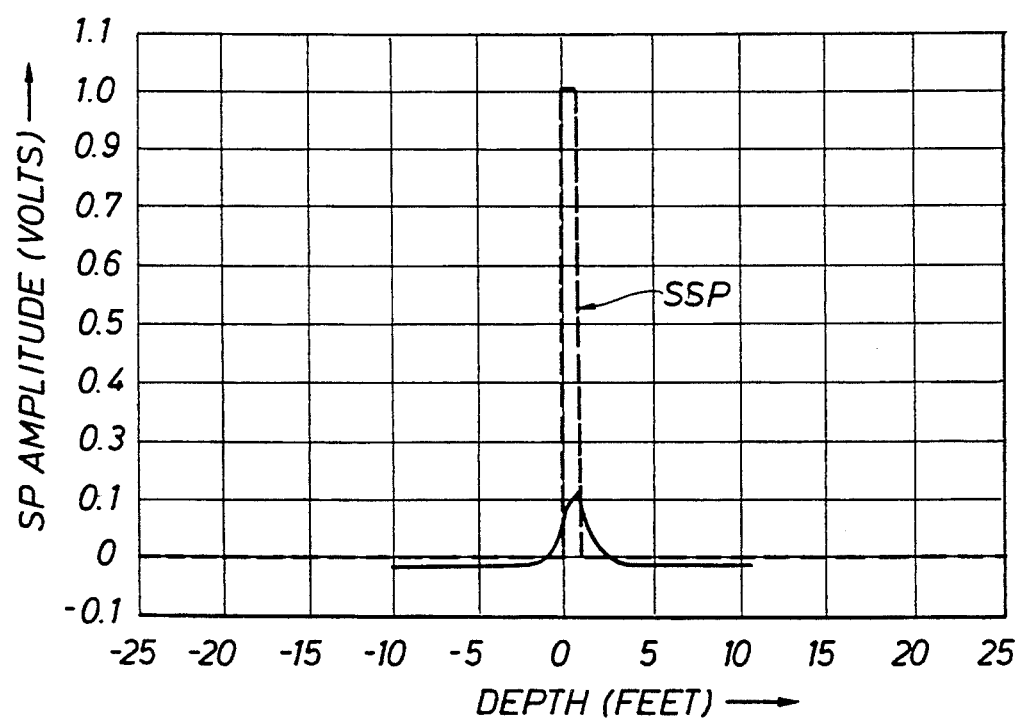
Figure 18:
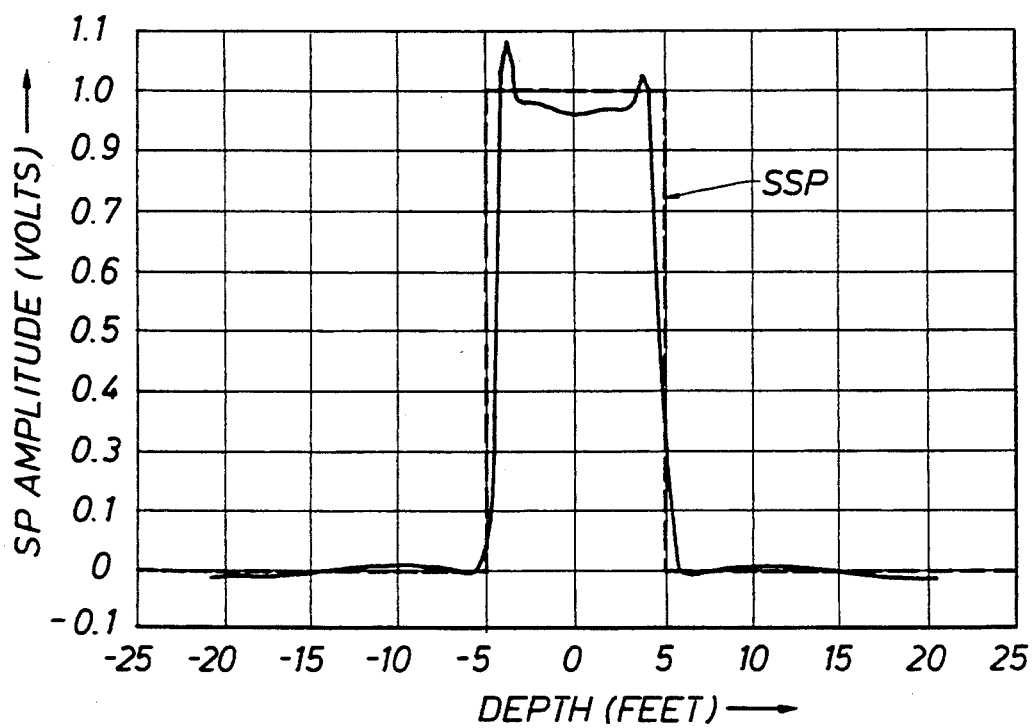
Figure 19:
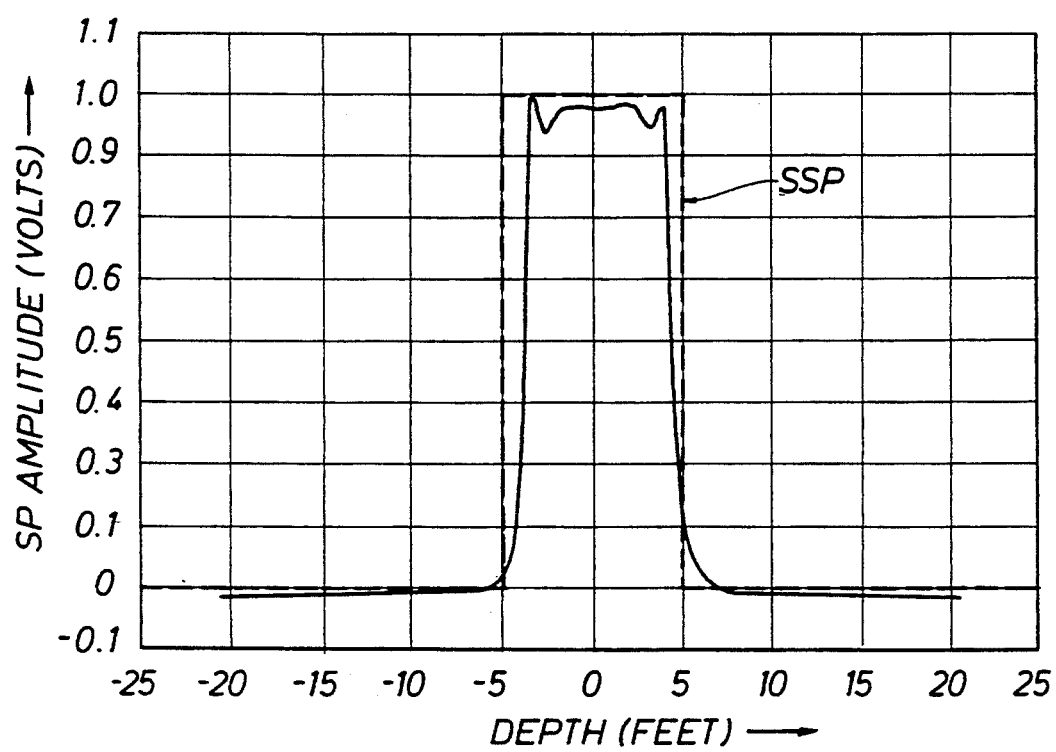
Figure 20:
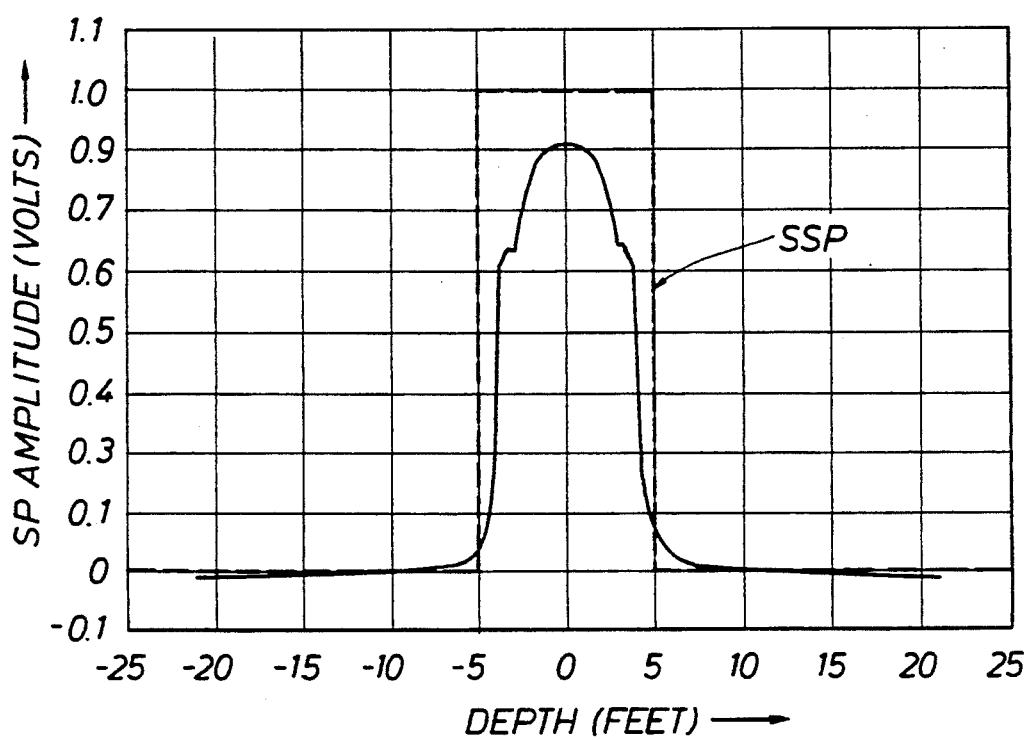
Figure 21:
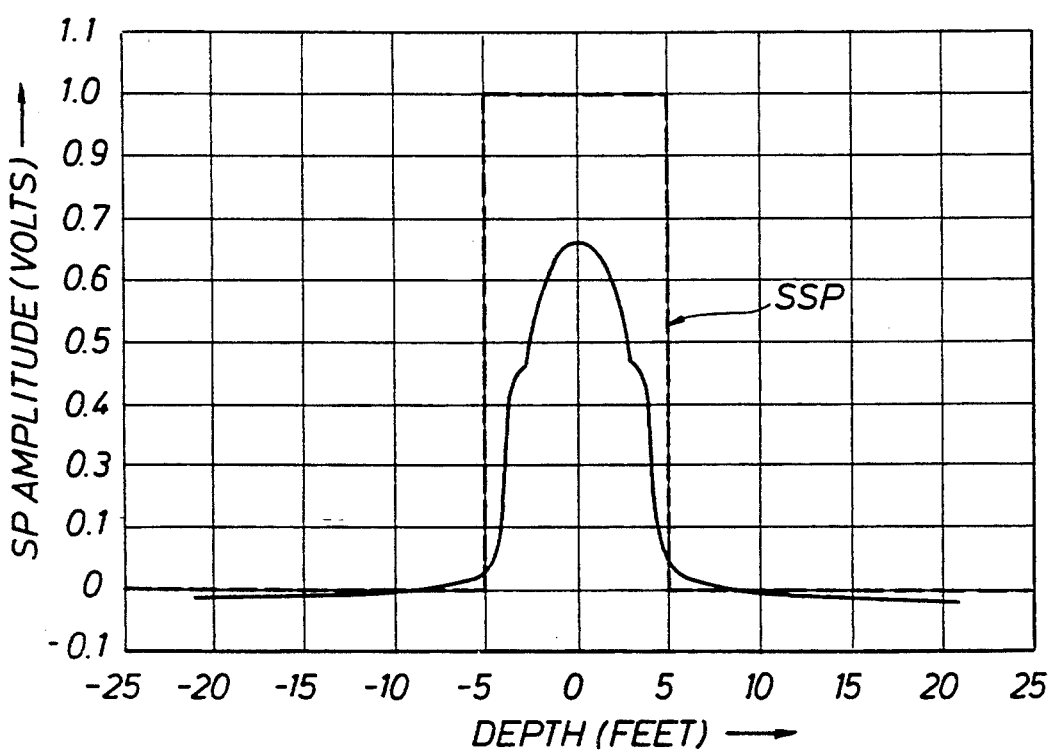

Referring to FIGS. 14–21, when the preceding monitoring conditions are imposed on the sonde of FIG. 9b, the resulting potential profile along the sonde is shown in FIG. 14 for a typical single permeable bed surrounded by semi infinite shale. The shale to mud resistivity contrast, Rs/Rm is 5, Rxo/Rm is 100, Rt/Rm is 20, invasion diameter Di is 40 inches and borehole size is assumed to be 8 inches. Bed thickness H is assumed to be 80 inches. The corresponding simulated log as the sonde is probing the formation is shown in FIG. 15 as a function of depth. The improved vertical resolution of the Active Spontaneous Potential sub of FIGS. 7–9d is illustrated in FIG. 16. A 40 inch bed is clearly detected and the center bed reading is reading close to the static spontaneous potential SSP. FIG. 17 shows that a 20 inch bed falls below the inherent vertical resolution of the present active electrode array of FIGS. 7–9d. The effect of invasion in a 120 inch bed is shown in FIGS. 18–21 for Di=10, 40, 80, and 120 inch. It is clear that the relative amplitude reduction is comparable to the magnitude one sees on a standard laterolog measurement and therefore amenable to further corrections.

Referring to FIGS. 10, 11a–11d, a detailed construction of a spontaneous potential (SP) measurement apparatus connected between two metallic housings in accordance with the present invention is illustrated.

In FIG. 10, the SP measurement apparatus includes current driving circuitry 60 connected to the blocking electrodes A1u, A1l and receiving circuitry 62 connected to the monitoring electrodes M1u, M2u and the measurement electrode (M) 84. Although the receiving circuitry 62 is shown in FIG. 10 as being only to the upper monitoring electrodes M1u, M2u, the same portion of the receiving circuitry 62 connected to the upper monitoring electrodes is also connected to the lower monitoring electrodes M1l, M2l. That is, another duplicate input switch, amplifier, and sampling circuit, similar to the input switch 68, amplifier 66 and sampling circuit 70, is interconnected between the lower monitoring electrodes M1l, M2l and the multiplexer and digital to analog converter circuit 78. The current driving circuitry 60 and receiving circuitry 62 is designed to apply and maintain the aforementioned monitoring conditions to the electrode array when the electrode array is interconnected between the two metallic housings 46, 48 and to simultaneously measure the spontaneous potential of the formation by measuring the potential on measurement electrode M relative to a reference electrode 64, known as "the fish" 64.

The upper monitoring electrodes M1u, M2u are connected to an amplified 66 via an input switch 68, and the amplifier 66 is connected to a sampling circuit 70. In addition, a voltage difference between the measurement electrode 84 and the fish 64 is connected to another amplifier 72 via another input switch 74. The amplifier 72 is further connected to another sampling circuit 76. Both sampling circuits 70 and 76 are connected at their outputs to a multiplexer and digital to analog converter circuit 78.

Note that the two metallic housings 46 and 48 are electrically connected to each other via a first short circuit connection, and the two bucking electrodes A1u, A1l are also electrically connected to each other via a second short circuit connection (this would not be necessary if two bucking current sources are being used). The current driving circuitry 60, which consists of current source 60, is electrically connected to the first and second short circuit connections for delivering current from the two metallic housings, via the current source 60, to both bucking electrodes A1u, A1l. In response, the current propagating from both bucking electrodes returns to ground potential via the two metallic housings 46, 48 in the manner shown in FIGS. 7 and 8 of the drawings.

A functional decription of the operation of the spontaneous potential measurement apparatus of the present invention will be set forth in the following paragraphs with the reference to FIGS. 10 and 11a–11d of the drawings.

Figure 11A:
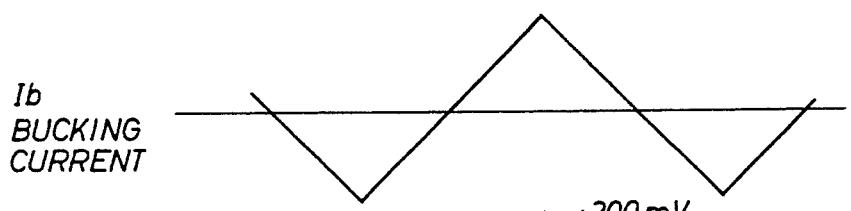
Figure 11B:
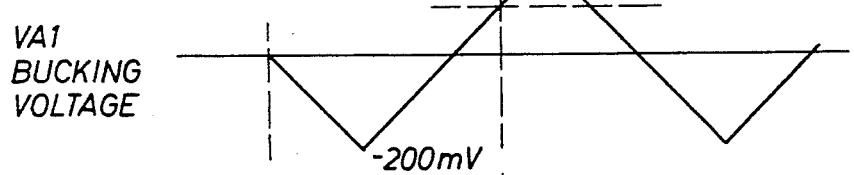
Figure 11C:
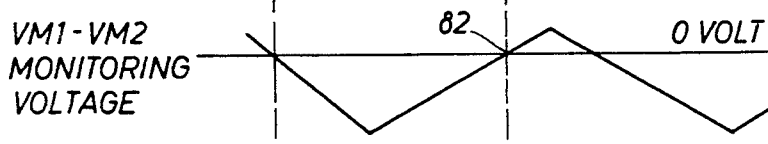

In FIG. 10, a current is delivered from current source 60 to the two bucking electrodes A1u, A1l. The current being delivered to the bucking electrodes is shown in FIG. 11a of the drawings. The voltage being delivered to the bucking electrodes Au1, A1l is shown in FIG. 11b of the drawings. A further current flows from the bucking electrodes and into the formation traversed by the wellbore, this further current returning to ground potential by flowing into the metallic housings 46, 48 in the manner shown by element numeral 54 in FIGS. 7 and 8 of the drawings. There is an interaction between the further current from the bucking electrodes and the flowing currents in the formation resulting from the formation's electromotive force (emf), this interaction being illustrated in FIG. 8 of the drawings. A voltage appears across the upper monitoring electrodes M1u, M2u and across the lower monitoring electrodes M1l, M2l in response to the flow of the further current from the bucking electrodes, this voltage across the monitoring electrodes appearing in FIG. 11c of the drawings. Similarly, another voltage appear across the lower monitoring electrodes in response to the further current flowing from the bucking electrodes. The voltage across the upper monitoring electrodes M1u, M2u (hereinafter termed 'the first voltage') is amplified by amplifier 66 in FIG. 10. Similarly, the voltage between the measurement electrode M and the fish 64 (hereinafter termed 'the second voltage') is amplified by amplifier 72. The first voltage is sampled by the sampler circuit 70, and the second voltage is sampled by sampler circuit 76. However, when the first voltage across the upper monitoring electrodes, sampled by the sampler circuit 70, crosses zero (0) volts as shown in FIG. 11c, only then is the second voltage, sampled by sampler circuit 76, input to the multiplexer 78. The output of the multiplexer undergoes conversion to an analog voltage in a digital to analog converter 78.

Figure 11D:
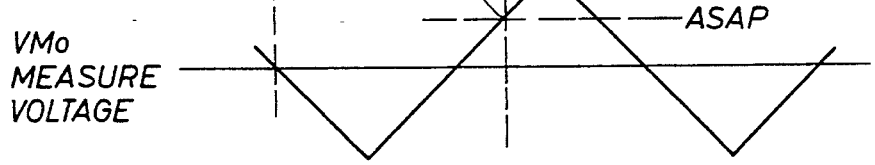

As a result, the output signal from the digital to analog converter 78 comprises only that portion of the second voltage between the measurement electrode M and the fish 64 which existed at the precise moment in time when the first voltage between the monitoring electrodes M1u, M2u was equal to zero volts. FIG. 11d illustrates that portion 80 of the second voltage (hereinafter known as 'the measure voltage' 80) which exists at the precise moment in time when the first voltage, in FIG. 11c, is equal to zero volts, at 82. The measure voltage 80 in FIG. 11d is only one point on a potential curve which comprises the static spontaneous potential (SSP) of the earth formation as measured by the spontaneous potential measurement apparatus of FIG. 10 in accordance with the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus adapted to be disposed in a wellbore for measuring a spontaneous potential of a formation traversed by the wellbore, a plurality of naturally occuring currents flowing in said formation, comprising:

a first metallic housing;

a second metallic housing; and a spontaneous potential measurement apparatus including a housing, the housing of said spontaneous potential measurement apparatus being interconnected between said first metallic housing and said second metallic housing, said spontaneous potential measurement apparatus including, a measurement electrode adapted for measuring said spontaneous potential of said formation adjacent said measurement electrode, said naturally occuring currents flowing in said formation in the vicinity of said measurement electrode, and current counteracting means for generating a counteracting current, the counteracting current from said current counteracting means counteracting and nullifying at least some of said naturally occuring currents flowing in said formation in the vicinity of said measurement electrode, said counteracting current returning to a ground potential via either said first metallic housing or said second metallic housing, said measurement electrode measuring said spontaneous potential of said formation adjacent said measurement electrode when said counteracting current from said current counteracting means counteracts and nullifies said at least some of said naturally occuring currents flowing in said formation in the vicinity of said measurement electrode.

2. The apparatus of claim 1, wherein said current counteracting means comprises:

a bucking electrode disposed on both sides of said measurement electrode adapted for generating said counteracting current;

at least one monitoring electrode disposed between each of the bucking electrodes and the measurement electrode, said at least one monitoring electrode being located on both sides of said measurement electrode; and current source means connected to the bucking electrodes for providing a first current to each of said bucking electrodes, said bucking electrodes generating said counteracting current in response to the first current, a potential existing between each of the monitoring electrodes and the measurement electrode, said potential difference being approximately equal to zero in response to a predetermined magnitude of said counteracting current from said bucking electrodes, whereby substantially no current flows in the formation adjacent said measurement electrode when said potential difference is approximately equal to zero.

3. The apparatus of claim 2, wherein said counteracting current generated by one of said bucking electrodes is returned to a ground potential via said first metallic housing and said counteracting current generated by the other of said bucking electrodes is returned to the ground potential via said second metallic housing.

4. The apparatus of claim 2, wherein said at least one monitoring electrode disposed between each of the bucking electrodes and the measurement electrode comprises:

a pair of monitoring electrodes, said potential difference existing between said pair of monitoring electrodes disposed on one side of said measurement electrode, said potentials difference existing between said pair of monitoring electrodes disposed on the other side of said measurement electrode, said potential difference between each of said pair of monitoring electrodes being approximately equal to zero in response to a predetermined magnitude of said counteracting current from each of said bucking electrodes.

5. The apparatus of claim 4, wherein said counteracting current generated by one of said bucking electrodes is returned to a ground potential via said first metallic housing and said counteracting current generated by the other of said bucking electrodes is returned to the ground potential via said second metallic housing.

6. The apparatus of claim 5, wherein said spontaneous potential measurement apparatus further comprises:

reading means for reading the measurement of said spontaneous potential of said formation adjacent said measurement electrode when said potential difference between each of said pair of monitoring electrodes is approximately equal to zero.

7. The apparatus of claim 6, wherein said reading means comprises:

first reading means connected to said measurement electrode for reading the measurement of said spontaneous potential of said formation taken by said measurement electrode relative to a reference potential;

second reading means connected to each of said pair of monitoring electrodes for reading said potential difference between each of said pair of monitoring electrodes; and output means connected to said first reading means and said second reading means for generating an output signal, said output signal comprising the measurement of said spontaneous potential read by said first reading means which occurred at points in time that coincide with the points in time when said potential difference read by said second reading means is approximately equal to zero.

8. A method of measuring a spontaneous potential of a formation traversed by a wellbore, comprising the steps of:

(a) interconnecting a housing of a spontaneous potential measurement apparatus between a first metallic housing and a second metallic housing;

(b) lowering said first metallic housing, said spontaneous potential measurement apparatus, and said second metallic housing into said wellbore, said spontaneous potential measurement apparatus including a measurement electrode, a bucking electrode disposed on both sides of said measurement electrode, and at least one monitoring electrode disposed between each said bucking electrode and said measurement electrode;

(c) driving each of the bucking electrodes with a first current, each of the bucking electrodes generating a second current, the second current generated by each of the bucking electrodes being returned to a ground potential via either said first metallic housing or said second metallic housing; and (d) when a potential difference between each of the monitoring electrodes and the measurement electrode is approximately zero, reading said spontaneous potential relative to a reference potential from said measurement electrode, said spontaneous potential read from said measurement electrode during the reading step (d) representing said spontaneous potential of said formation traversed by said wellbore.

9. The method of claim 8, wherein said spontaneous potential measurement apparatus includes said measurement electrode, said bucking electrode disposed on both sides of said measurement electrode, and a pair of monitoring electrodes disposed between each said bucking electrode and said measurement electrode, the reading step (d) comprising the step of:

(e) when a potential difference between each of the pair of monitoring electrode is approximately zero, reading said spontaneous potential relative to said reference potential from said measurement electrode, said spontaneous potential read from said measurement electrode during the reading step (e) representing said spontaneous potential of said formation traversed by said wellbore.

10. An apparatus adapted to be disposed in a wellbore for measuring a spontaneous potential of a formation traversed by the wellbore, a plurality of naturally occuring currents flowing in said formation, comprising:

a first housing;

a second housing; and a measurement apparatus including a housing, the housing of said measurement apparatus being interconnected between said naturally occuring currents flowing in said formation adjacent the measurement electrode, the first and second metallic housings and the bucking electrodes being substantially cancelled when the first and second potential differences are approximately equal to zero, said measurement electrode measuring said spontaneous potential of said formation adjacent said measurement electrode when said naturally occurring current flowing in said formation adjacent said measurement electrode is substantially cancelled.

11. The apparatus of claim 10, wherein said current nullification means comprises:
   a bucking electrode disposed on both sides of said measurement electrode;
   at least one monitoring electrode disposed between each of the bucking electrodes and the measurement electrode thereby disposing a monitoring electrode on both sides of said measurement electrode; and
   current source means connected to the bucking electrodes for providing a first current to each of said bucking electrodes, said bucking electrodes generating said nullification current in response to the first current, said nullification current from said bucking electrodes returning to a ground potential via said first housing and said second housing,
   a potential difference existing between each of the monitoring electrodes and the measurement electrode,
   said potential difference being approximately equal to zero in response to a predetermined magnitude of said nullification current from said bucking electrodes, said first housing and said second housing, said measurement apparatus including,
   a measurement electrode adapted for measuring a spontaneous potential of said formation adjacent said measurement electrode, said naturally occuring currents flowing in said formation adjacent said measurement electrode, and
   current nullification means for generating a nullification current which counteracts and nullifies the flow of said naturally occuring currents flowing in said formation adjacent said measurement electrode,
   said nullification current generated by said current nullification means returning to a ground potential via said first housing and said second housing,
   said measurement electrode measuring said spontaneous potential of said formation adjacent said measurement electrode when said nullification current generated by said current nullification means counteracts and nullifies at least some of said naturally occuring currents flowing in said formation adjacent said measurement electrode.

12. An apparatus adapted to be disposed in a wellbore for measuring a spontaneous potential of a formation traversed by the wellbore, a plurality of naturally occuring currents flowing in said formation, comprising:
   a first metallic housing;
   a second metallic housing; and
   a spontaneous potential measurement apparatus including a housing, the housing of said spontaneous potential measurement apparatus being interconnected between the first metallic housing and the second metallic housing, said spontaneous potential measurement apparatus including,
   a measurement electrode adapted for measuring said spontaneous potential of said formation adjacent said measurement electrode, said naturally occuring currents flowing in said formation adjacent said measurement electrode,
   a bucking electrode disposed on both sides of said measurement electrode, said naturally occuring currents flowing in said formation adjacent the metallic housings and the bucking electrodes,
   a pair of monitoring electrodes disposed between each of the bucking electrodes and the measurement electrode, and
   current source means connected to the bucking electrodes for providing a first current to each of said bucking electrodes, said bucking electrodes generating a second current in response thereto, said second current from said bucking electrodes flowing in said formation and returning to a ground potential via either said first metallic housing or said second metallic housing,
   a first potential difference existing between each of the pair of monitoring electrodes, said first potential difference being approximately equal to zero in response to a predetermined magnitude of said second current from said bucking electrodes,
   a second potential difference existing between each of the bucking electrodes, said second potential difference being approximately equal to zero in response to said predetermined magnitude of said second current from said bucking electrodes,
   whereby substantially no current flows in the formation adjacent said measurement electrode when said potential difference is approximately equal to zero.

13. The apparatus of claim 12, wherein said spontaneous potential measurement apparatus further comprises:
   reading means for reading the measurement of said spontaneous potential of said formation adjacent said measurement electrode when said first potential difference and said second potential difference is approximately equal to zero.

14. An apparatus adapted to be disposed in a wellbore for measuring a spontaneous potential of an earth formation penetrated by said wellbore, comprising:
   a first metallic housing;
   a second metallic housing; and
   a spontaneous potential sub including a sub housing, said sub housing being interconnected between said first metallic housing and said second metallic housing, said spontaneous potential sub including,
   a measurement electrode adapted for measuring the spontaneous potential of said formation, a naturally occurring current flowing in the formation adjacent said measurement electrode,
   a first electrode adapted for generating a counteracting current and flowing said counteracting current in said formation for counteracting and cancelling said naturally occurring current in said formation, said counteracting current in said formation returning to a ground potential via either said first metallic housing or said second metallic housing, and
   a monitoring electrode disposed between said measurement electrode and said first electrode, a potential difference existing between said monitoring electrode and said measurement electrode,
   said potential difference being approximately zero when said counteracting current from said first electrode counteracts and cancels said naturally occurring current,
   said measurement electrode measuring said spontaneous potential of said formation when said potential difference is approximately zero.

15. The apparatus of claim 14, further comprising:
   a second monitoring electrode disposed between said monitoring electrode and said measurement electrode, said potential difference existing between said monitoring electrode and said second monitoring electrode, said potential difference being approximately zero when said counteracting current from said first electrode counteracts and cancels said naturally occurring current, said measurement electrode measuring said spontaneous potential of said formation when said potential difference between the monitoring electrodes is approximately zero.

16. A method of measuring a spontaneous potential of an earth formation penetrated by a wellbore, comprising the steps of: interconnecting a housing of a spontaneous potential sub between a housing of a first tool string and a housing of a second tool string thereby producing a system;

lowering said system into said wellbore, said spontaneous potential sub including a measurement electrode adapted for measuring said spontaneous potential of said formation penetrated by said wellbore, a current emitting electrode disposed on one side of said measurement electrode adapted for emitting a counteracting current into said formation, and a monitoring electrode disposed between said current emitting electrode and said measurement electrode, a potential difference existing between said monitoring electrode and said measurement electrode, a naturally occurring current flowing in said formation in the vicinity of said measurement electrode;

emitting said counteracting current from said current emitting electrode, said counteracting current returning to a ground potential via the housing of said first tool string, said counteracting current counteracting and cancelling at least a portion of said naturally occurring current flowing in said formation in the vicinity of said measurement electrode, said potential difference being approximately equal to zero when said counteracting current cancels said at least a portion of said naturally occurring current in the vicinity of said measurement electrode; and when said potential difference is approximately equal to zero, reading said spontaneous potential of said formation from said measurement electrode.

17. The method of claim 16, wherein said spontaneous potential sub further comprises another current emitting electrode disposed on the other side of said measurement electrode adapted for emitting another counteracting current into said formation and another monitoring electrode disposed between said another current emitting electrode and said measurement electrode, another potential difference existing between said another monitoring electrode and said measurement electrode, and wherein the emitting step further includes the step of:

further emitting said another counteracting current from said another current emitting electrode, said another counteracting current returning to a ground potential via the housing of said second tool string, said counteracting current and said another counteracting current substantially counteracting and cancelling said naturally occurring current flowing in said formation in the vicinity of said measurement electrode, said another potential difference being approximately equal to zero when said counteracting current and said another counteracting current substantially cancels said naturally occurring current in the vicinity of said measurement electrode.

18. The method of claim 17, wherein the reading step comprises the step of:

when said potential difference between said monitoring electrode and said measurement electrode is approximately equal to zero, and when said another potential difference between said another monitoring electrode and said measurement electrode is approximately equal to zero, reading said spontaneous potential of said formation from said measurement electrode.

* * * * *

UNITED STATES PATENT AND TRADEMARK OFFICE
CERTIFICATE OF CORRECTION

PATENT NO. : 5,402,069

DATED : March 28, 1995

INVENTOR(S) : Jacques R. Tabanou

It is certified that error appears in the above-identified patent and that said Letters Patent is hereby corrected as shown below:

Delete the following particular section of claim 10, lines 9-19 appearing in column 14, lines 60-68 and 15, lines 1-2:

"connected between said naturally occurring currents flowing in said formation adjacent the measurement electrode, the first and second metallic housings and the bucking electrodes being substantially cancelled when the first and second potential differences are approximately equal to zero, said measurement electrode measuring said spontaneous potential of said formation adjacent said measurement electrode when said naturally occurring current flowing in said formation adjacent said measurement electrode is substantially cancelled"

UNITED STATES PATENT AND TRADEMARK OFFICE
CERTIFICATE OF CORRECTION

PATENT NO.   : 5,402,069
DATED        : March 28, 1995
INVENTOR(S)  : Jacques R. Tabanou It is certified that error appears in the above-identified patent and that said Letters Patent is hereby corrected as shown below:

Substitute the following paragraphs in place of said particular section of claim 10, lines 9-19:

"connected between said first housing and said second housing, said measurement apparatus including, a measurement electrode adapted for measuring a spontaneous potential of said formation adjacent said measurement electrode, said naturally occurring currents flowing in said formation adjacent said measurement electrode, and current nullification means for generating a nullification current which counteracts and nullifies the flow of said naturally occurring currents flowing in said formation adjacent said measurement electrode, said nullification current generated by said current nullification means returing to a ground potential via said first housing and said second housing, said measurement electrode measuring said spontaneous potential of said formation adjacent said measurement electrode when said nullification current generated by said current nullification means counteracts and nullifies at least some of said naturally occuring currents flowing in said formation adjacent said measurement electrode."

UNITED STATES PATENT AND TRADEMARK OFFICE
CERTIFICATE OF CORRECTION

PATENT NO. : 5,402,069                                   Page 3 of 5

DATED      : March 28, 1995

INVENTOR(S): Jacques R. Tabanou

It is certified that error appears in the above-identified patent and that said Letters Patent is hereby corrected as shown below:

Delete the following particular section of claim 11, lines 23-44 which appears in column 15, lines 25-46:

"trodes, said first housing and said second housing, said measurement apparatus including, a measurement electrode adapted for measuring a spontaneous potential of said formation adjacent said measurement electrode, said naturally occurring currents flowing in said formation adjacent said measurement electrode, and current nullification means for generating a nullification current which counteracts and nullifies the flow of said naturally occuring currents flowing in said formation adjacent said measurement electrode, said nullification current generated by said current nullification means returing to a ground potential via said first housing and said second housing, said measurement electrode measuring said spontaneous potential of said formation adjacent said measurement electrode when said nullification current generated by said current nullification means counteracts and nullifies at least some of said naturally occuring currents flowing in said formation adjacent said measurement electrode."

UNITED STATES PATENT AND TRADEMARK OFFICE
CERTIFICATE OF CORRECTION

PATENT NO.   :   5,402,069

DATED        :   March 28, 1995

INVENTOR(S)  :   Jacques R. Tabanou

It is certified that error appears in the above-identified patent and that said Letters Patent is hereby corrected as shown below:

Substitute the following paragraph in place of the particular section of claim 11, lines 23-44:

"trodes, whereby substantially no current flows in the formation adjacent said measurement electrode when said potential difference is approximately equal to zero."

Delete the following particular section of claim 12, lines 43-46, which appears in column 16, lines 22-25:

"whereby substantially no current flows in the formation adjacent said measurement electrode when said potential difference is approximately equal to zero."

UNITED STATES PATENT AND TRADEMARK OFFICE
CERTIFICATE OF CORRECTION

PATENT NO. : 5,402,069
DATED : March 28, 1995
INVENTOR(S) : Jacques R. Tabanou

It is certified that error appears in the above-identified patent and that said Letters Patent is hereby corrected as shown below:

Substitute the following paragraphs in place of the particular section of claim 12, lines 43-46:

"said naturally occurring currents flowing in said formation adjacent the measurement electrode, the first and second metallic housings and the bucking electrodes being substantially cancelled when the first and second potential differences are approximately equal to zero, said measurement electrode measuring said spontaneous potential of said formation adjacent said measurement electrode when said naturally occurring current flowing in said formation adjacent said measurement electrode is substantially cancelled."

Signed and Sealed this

Thirteenth Day of June, 1995

Attest:

BRUCE LEHMAN

Attesting Officer

Commissioner of Patents and Trademarks